(12) United States Patent
Ha et al.

(10) Patent No.: US 7,590,499 B2
(45) Date of Patent: Sep. 15, 2009

(54) RECORDING AND CONVEYING ENERGY CONSUMPTION AND POWER INFORMATION

(75) Inventors: Wai-leung Ha, Pokfulam (HK); Kairy Kai Lei, Shen Zhen (CN)

(73) Assignee: Computime, Ltd., Hong Kong (HK)

( * ) Notice: Subject to any disclaimer, the term of this patent is extended or adjusted under 35 U.S.C. 154(b) by 0 days.

(21) Appl. No.: 11/770,054

(22) Filed: Jun. 28, 2007

(65) Prior Publication Data

US 2008/0001595 A1 Jan. 3, 2008

Related U.S. Application Data

(63) Continuation-in-part of application No. 11/427,161, filed on Jun. 28, 2006.

(51) Int. Cl.
*G01R 21/00* (2006.01)

(52) U.S. Cl. ............... 702/60; 702/46; 702/57; 702/61; 702/64; 702/65; 702/99; 702/187; 702/188; 705/412; 324/103 R; 324/104; 324/105; 324/114; 324/116; 324/158.1; 340/3.1; 340/3.3; 340/3.32; 340/500; 340/540; 340/635; 340/637; 340/653; 340/657; 340/658; 340/659; 340/660; 340/664; 340/679; 340/870.01; 340/870.02; 340/870.07; 340/870.16; 700/17; 700/83; 700/86; 700/286; 700/291; 700/297; 713/1; 713/2; 713/10

(58) Field of Classification Search ........... 702/46, 702/57, 60–61, 64–65, 99, 187–188; 705/412; 324/103 R, 104–105, 114–116, 158.1; 340/3.1, 340/3.3, 3.32, 500, 540, 635, 637, 653, 657–660, 340/664, 679, 825, 870.01, 870.02, 870.07, 340/870.16; 700/17, 83, 86, 286, 291, 297; 707/1–10; 713/1, 2, 100

See application file for complete search history.

(56) References Cited

U.S. PATENT DOCUMENTS 4,734,628 A    3/1988    Bench et al.

(Continued)

FOREIGN PATENT DOCUMENTS

CN    2215091 Y    12/1995

(Continued)

OTHER PUBLICATIONS

International Search Report for PCT/IB2007003018, dated Jan. 31, 2008 pp. 1-5.

(Continued)

*Primary Examiner*—Tung S Lau
*Assistant Examiner*—Sujoy K Kundu
(74) *Attorney, Agent, or Firm*—Banner & Witcoff, Ltd.

(57) ABSTRACT

Aspects of the invention provide apparatuses, methods, and systems that support measuring and conveying energy consumption by an electrical device. An apparatus includes an energy sensor that measures an incremental energy value consumed by an electrical device. Apparatus obtains the incremental energy value, accumulates an energy usage measurement in accordance with the incremental energy value, provides requested information about energy consumption of the electrical device in response to a request from a network controller, and adjusts the energy usage measurement in accordance with the requested information. The total energy consumption may be partitioned into at least one energy component, in which the at least one energy component corresponds to the energy consumption of the electrical device during an associated time interval. A network controller may use the energy consumption information to determine a new set temperature for a thermostat unit that instructs the device control logic.

10 Claims, 14 Drawing Sheets

U.S. PATENT DOCUMENTS

| | | |
|---|---|---|
| 5,115,968 A | 5/1992 | Grald |
| 5,309,730 A | 5/1994 | Strand et al. |
| 5,410,230 A | 4/1995 | Bessler et al. |
| 5,737,730 A | 4/1998 | Alvarenga et al. |
| 6,134,901 A * | 10/2000 | Harvest et al. ............ 62/228.4 |
| 6,374,188 B1 | 4/2002 | Hubbard et al. |
| 6,487,457 B1 * | 11/2002 | Hull et al. .................... 700/17 |
| 6,819,098 B2 | 11/2004 | Villicana et al. |
| 6,866,202 B2 | 3/2005 | Sigafus et al. |
| 7,209,838 B1 | 4/2007 | Wright et al. |
| 2004/0243524 A1 | 12/2004 | Crichlow |
| 2006/0294032 A1 | 12/2006 | Chen et al. |
| 2008/0000246 A1 | 1/2008 | Ha et al. |

FOREIGN PATENT DOCUMENTS

| | | |
|---|---|---|
| CN | 1414313 A | 4/2003 |
| CN | 1959263 A | 5/2007 |
| GB | 2260785 A | 4/1993 |
| JP | 59077245 A | 5/1984 |
| JP | 3218803 A | 9/1991 |
| JP | 11-337149 A | 12/1999 |
| JP | 2000330649 A | 11/2000 |
| JP | 2005-25654 A | 1/2005 |

OTHER PUBLICATIONS

International Search Report for PCT/CN2008/001243, dated Sep. 18, 2008 pp. 1-5.

* cited by examiner

US 7,590,499 B2

RECORDING AND CONVEYING ENERGY CONSUMPTION AND POWER INFORMATION

This application is a continuation-in-part of co-pending U.S. patent application Ser. No. 11/427,161 entitled "Conveying Temperature Information in a Controlled Variable Speed Heating, Ventilation, and Air Conditioning (HVAC) System" and filed on Jun. 28, 2006, the entire disclosure of which is hereby incorporated by reference.

FIELD OF THE INVENTION

The present invention relates generally to measuring energy consumption of an electrical device and sending related information over a network.

BACKGROUND OF THE INVENTION

An air conditioning system is typically one of the high power consumption devices in a house or office building. With a traditional air-conditioning system that is controlled by a typical thermostat, the system typically cycles ON and OFF according to the differences of preset and measured temperature. The system draws a constant current or power when it is operating in the ON cycle. It essentially shuts off when in operating in the OFF cycle, and consequently no current or power is drawn from the electrical main circuit when it is operating in the OFF cycle. In order to estimate the energy consumption of the system, one may calculate the accumulated ON time and multiple it by the power consumption of the device to obtain the total energy consumption of the system.

With the above scenario, the energy (power) consumption of a device may be obtained from the specification or by a simple current meter. The same approach applies to week and month estimation of the energy consumption. However, the above approach may no longer hold if the compressor or motor is a variable speed device. For a variable speed compressor, the speed of the compressor may vary according to the differences of the ambient and set temperature. The power consumption varies with the speed of the motor/compressor and is no longer constant. Consequently, calculating the energy consumption of a device simply using ON/OFF duty cycle information from the thermostat is typically not adequate.

With the need to conserve electrical energy (power) usage, it is important for the actual electrical energy of an electrical device to be measured and reported.

SUMMARY OF THE INVENTION

The present invention provides apparatuses and methods that support measuring and conveying energy consumption by an electrical device.

With an aspect of the invention, an apparatus includes an energy sensor that measures an incremental energy value consumed by an electrical device during an incremental time duration. A processor obtains the incremental energy value, accumulates an energy usage measurement in accordance with the incremental energy value, provides requested information about energy consumption of the electrical device in response to a request from a network controller, and adjusts the energy usage measurement in accordance with the requested information.

With another aspect of the invention, an electrical device comprises a variable speed device. A logic control unit includes an array to provide at least one control signal to the variable speed device to control a speed of the variable speed device. A pulse width modulation controller controls a pulse width of the at least one control signal in accordance with a temperature difference and a feedback signal from the variable speed device.

With another aspect of the invention, the total energy consumption is partitioned into at least one energy component, in which the at least one energy component corresponds to the energy consumption of the electrical device during an associated time interval. The total energy consumption is adjusted by a transmitted value when a conformation is received.

With another aspect of the invention, a system includes a device control logic, which controls a variable speed device and sends energy consumption information to a network controller. The network controller may use the energy consumption information to determine a new set temperature for a thermostat unit that instructs the device control logic.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION OF PREFERRED EMBODIMENTS

Figure 1:
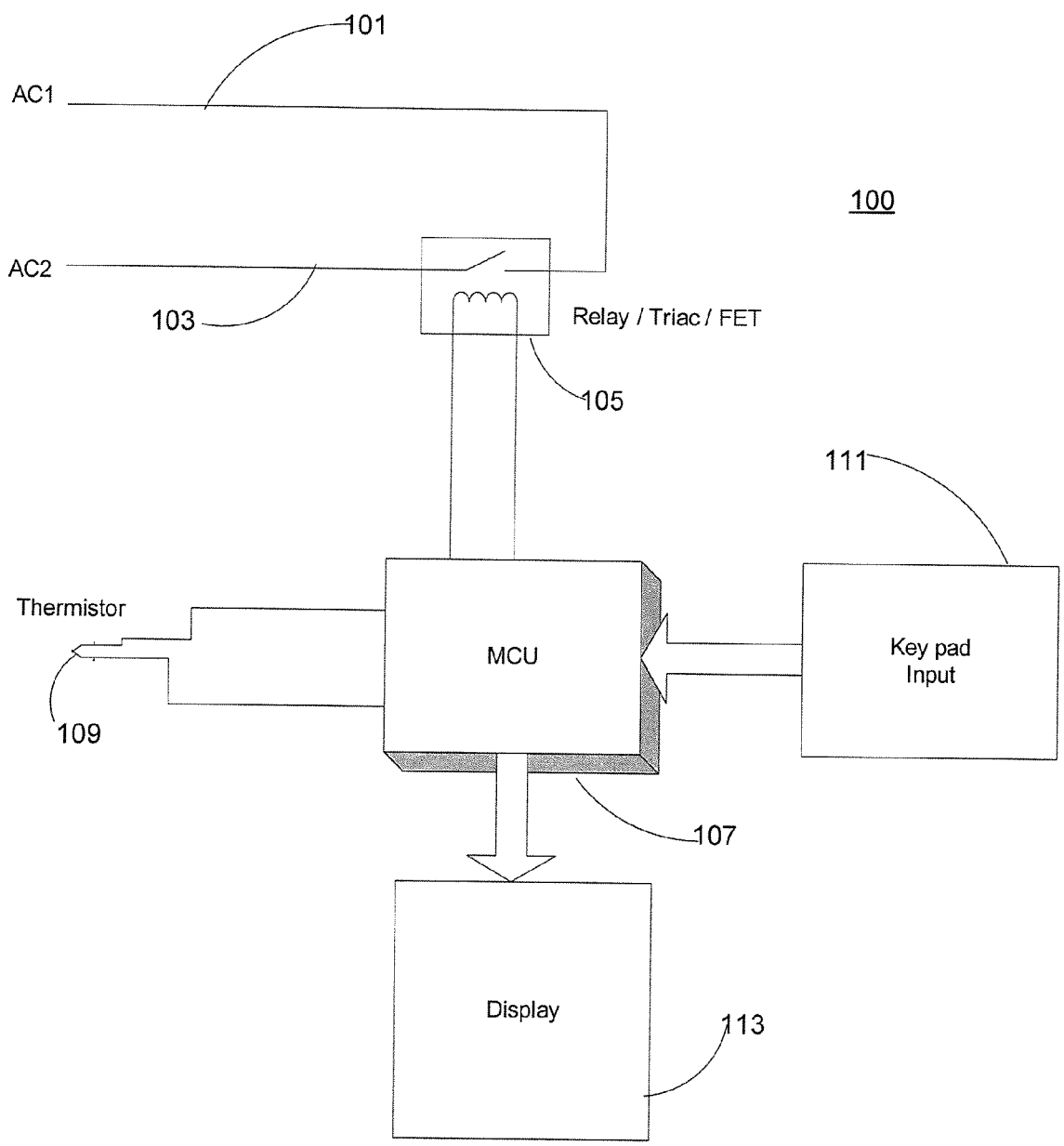
FIG. 1 shows a thermostat unit for controlling a variable speed compressor in accordance with an embodiment of the invention.

FIG. 1 shows a thermostat unit 100 for controlling a variable speed compressor (not shown) in accordance with an embodiment of the invention. Thermostat unit 100 includes microprocessor control unit (MCU) 107 and switching module 105. Switching module 105, which electrically turns on and off, may be implemented with a relay, triac, or field effect transistor (FET). Additionally, thermostat unit 100 may include keypad input 111 in order for a user to input a set temperature or a profile of set temperatures (as will be discussed) and display 113 to display the ambient temperature of a controlled space (e.g., a room) and the set temperature.

Microprocessor control unit 107 measures the ambient temperature of the controlled space with thermistor 109, which is situated in an appropriate point of the controlled space. Microprocessor control unit 107 consequently determines a difference temperature ($T_{diff}$) by subtracting the set temperature ($T_{set}$) from the ambient temperature ($T_{amb}$):

$$T_{diff} = T_{amb} - T_{set} \quad \text{(EQ. 1)}$$

In the embodiment shown in FIG. 1, switching module 105 is either in the "on" state or the "off" state. When in the "on" state, electrical conductivity is completed from line 101 to line 103 and an AC waveform (typically 24 volts AC) is provided to a compressor (for cooling) to a furnace control board (for heating). When in the "off" state, electrical conductivity is blocked. In the following discussion, the thermostat is supporting the cooling function (i.e., by communicating with a compressor controller to control a compressor as will be discussed).

Because switching module 105 is either on or off, only two states are directly supported. However, in accordance with an aspect of the invention, information that is indicative of $T_{diff}$ is transmitted from thermostat unit 100 to compressor controller unit 300 (as shown in FIG. 3 by varying the duty cycle of a signal (e.g., signal 200 as shown in FIG. 2) that is conveyed by lines 101, 103.

In an embodiment of an invention, thermostat unit 100 sends a special signal that has a short pulse duration to notify a furnace/air conditioner controller to immediately stop operation. For example, the special signal can be four consecutive pulses with 1 second on and 1 second off.

Figure 2:
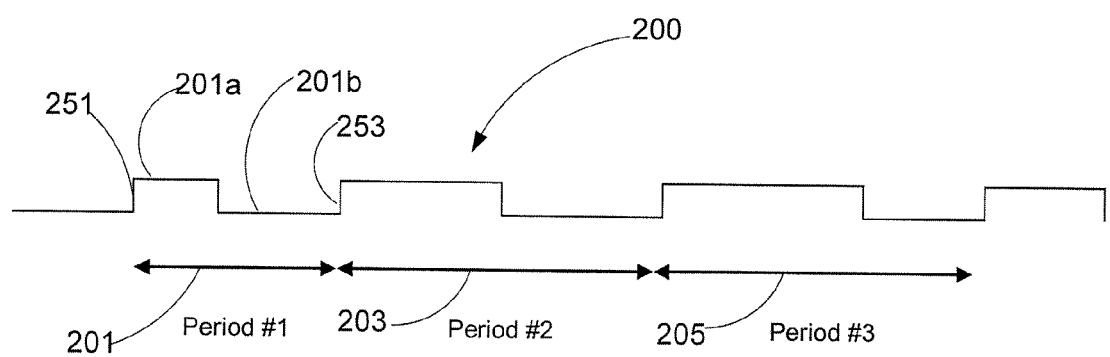
FIG. 2 shows a signal that is sent from a thermostat unit to a compressor controller unit for controlling a variable speed compressor in accordance with an embodiment of the invention.
Figure 3:
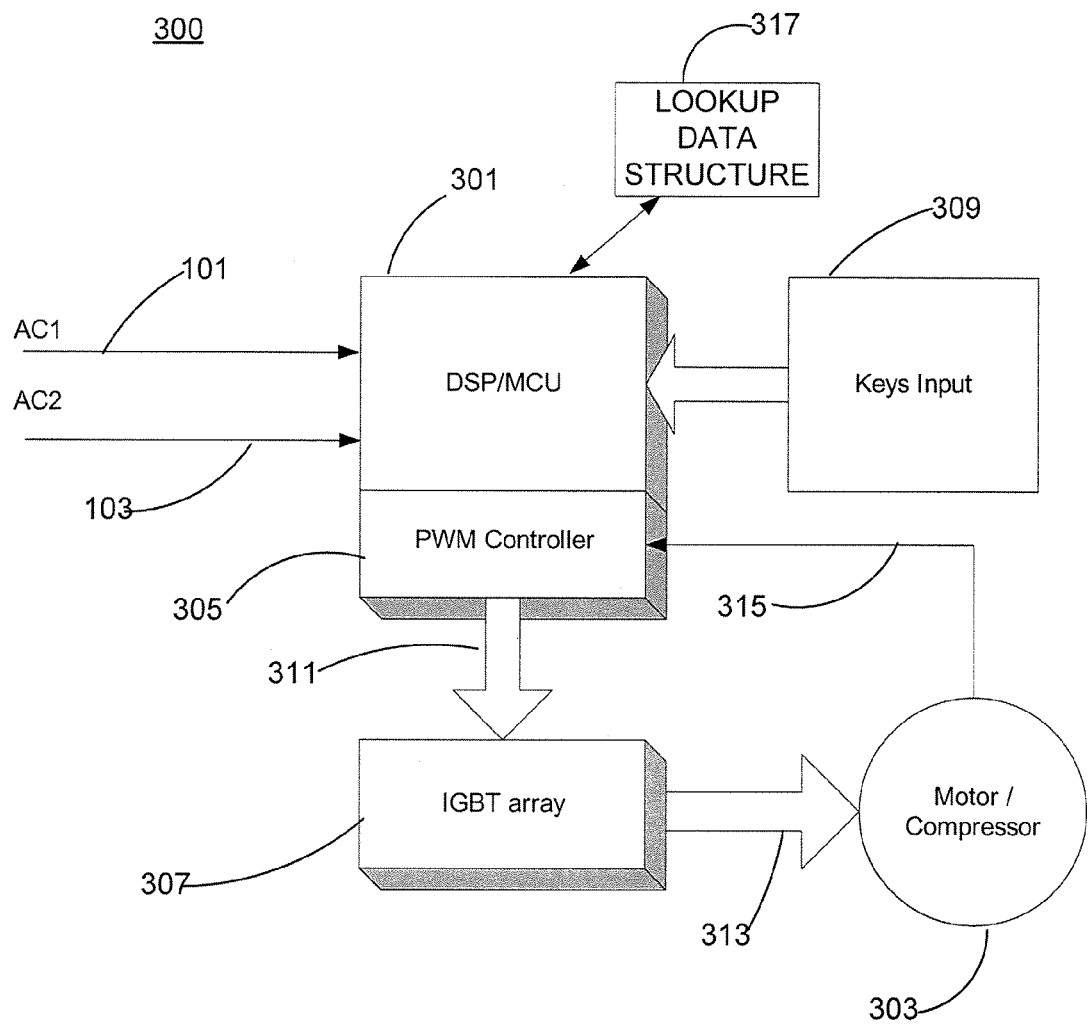
FIG. 3 shows a compressor controller unit for controlling a variable speed compressor in accordance with an embodiment of the invention.

FIG. 2 shows signal 200 that is sent from a thermostat unit 100 (as shown in FIG. 1) to a compressor controller unit 300 (as shown in FIG. 3) for controlling a variable speed compressor 303 (as shown in FIG. 3) in accordance with an embodiment of the invention. Signal 200, as shown in FIG. 2, spans a time duration over time periods 201, 203, and 205.

During each time period 201, 203, 205, signal 200 is being electrically conducted during an activated time duration ($T_{on}$) (e.g., activated time duration 201a for time period 201) and electrically blocked during an deactivated time duration ($T_{off}$) (e.g., deactivated time duration 201b for time period 201). During activated time duration 201a, AC power (corresponding to a 24 volts AC waveform) is conducted. During deactivated time duration 201b, AC power is not conducted. The corresponding duty cycle is determined by:

$$\text{Duty\_Cycle} = \frac{T_{on}}{T_{on} + T_{off}} \quad \text{(EQ. 2)}$$

In an embodiment of the invention, thermostat unit 100 notifies compressor unit 300 the value of $T_{max}$ by sending a configuration signal having a preamble followed by a number of pulses, in which the number of pulses is indicative of the value of $T_{max}$. In an exemplary embodiment, the preamble comprises a predetermined pulse sequence of two ON time periods followed by two OFF time periods, each time period being one second. For each ON time period, a pulse is generated for 0.5 second during an ON time period and not generated during an OFF time period. The value of $T_{max}$ (degrees Fahrenheit) is determined from the number of pulses following the preamble by:

$$T_{max} = 2^{(number\ of\ pulses + 5)} \quad \text{(EQ. 3)}$$

Referring to FIG. 1, microprocessor control unit 107 controls switching module 105 to turn on and turn off signal 200 based on any period of time. (In fact, as suggested by FIG. 2, the time period may vary from one time period to another.) The time period may be 5, 10 or 15 minutes or any other time period.

The duty cycle of signal 200 conveys information about the temperature difference ($T_{diff}$) as determined by microprocessor control unit 107. As suggested by FIG. 2, the duty cycle typically varies from one time period to another time period corresponding to temperature difference variations.

In an embodiment of the invention, the temperature difference ($T_{diff}$) is encoded by the duty cycle as follows:

$$\text{Duty\_Cycle} = T_{diff}/T_{max} * 50\% + 50\% \quad \text{(EQ. 4)}$$

Combining EQ. 4 and EQ. 2, one can determine the $T_{on}$ by:

$$T_{on} = (T_{diff}/T_{max} * 50\% + 50\%) * T_{cycle} \quad \text{(EQ. 5)}$$

where $T_{cycle} = T_{on} + T_{off}$

However, if the temperature difference if greater than $T_{max} - \Delta_{temp}$ or less than $-T_{max} + \Delta_{temp}$, the temperature difference is limited as follows:

$$T_{diff} = T_{max} - 1 \text{ if } T_{diff} >= T_{max} - \Delta_{temp} \quad \text{(EQ. 6a)}$$

$$T_{diff} = -T_{max} + 1 \text{ if } T_{diff} <= -T_{max} + \Delta_{temp} \quad \text{(EQ. 6b)}$$

Figure 4:
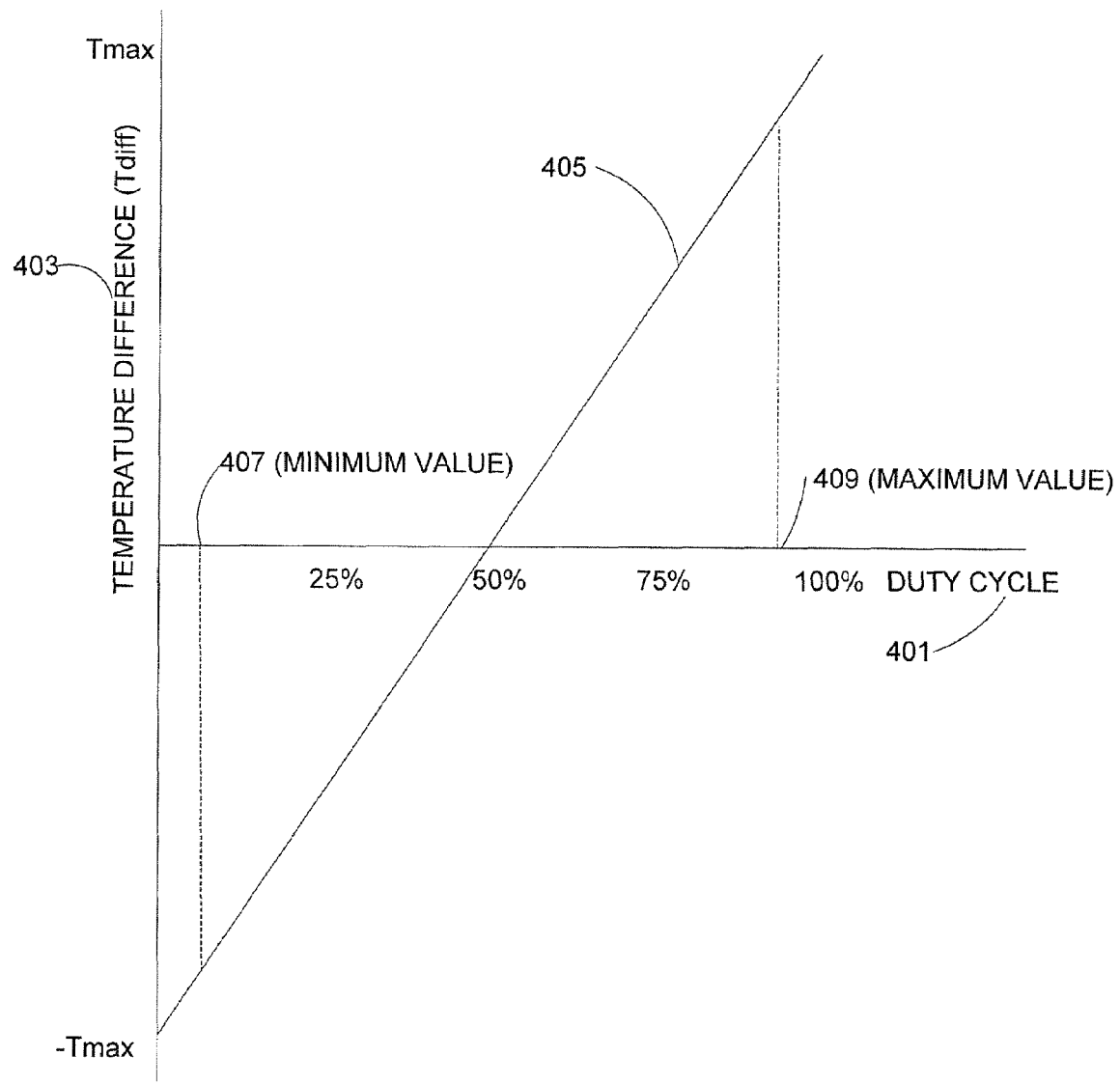
FIG. 4 shows a relationship between a temperature difference, referencing an ambient temperature to a set temperature, and a duty cycle of a signal in accordance with an embodiment of the invention.

$T_{max} - \Delta_{temp}$ corresponds to maximum value 409 of the duty cycle and $-T_{max} + \Delta_{temp}$ corresponds to minimum value 407 of the duty cycle as shown in FIG. 4. The limit of $|T_{diff}|$ is reduced by one degree Fahrenheit in EQ. 6a and EQ. 6b so that the signal is not detected to be ON or OFF all of the time by compressor controller unit 300 when thermostat unit 100 is sending control information. (If signal 200 were ON or OFF all of the time, no signal transitions could be detected.)

FIG. 3 shows compressor controller unit 300 for controlling a variable speed compressor 303 in accordance with an embodiment of the invention. Microprocessor control unit (MCU) 301 scans lines 101, 103 for signal 200 and detects a time between two rising signal edges (e.g., signal edges 251 and 253 as shown in FIG. 2) to determine the current time period of signal 200. Microprocessor control unit 301 may be coupled with a digital signal processor in order to facilitate calculations.

Referring to FIG. 2, when processing signal 200, compressor controller unit 300 waits receives duty cycle information for an entire time period before further processing the information. For example, compressor controller unit 300 determines the duty cycle for time period 201 from signal 200 after detecting signal edge 253. Compressor controller unit 300 consequently determines the temperature difference $T_{diff}$, as measured by thermostat unit 100, by decoding signal 200. (As will be discussed with FIG. 8, compressor controller unit 300 utilizes flow diagram 800 to measure the duty cycle.) Compressor controller unit 300 measures the duty cycle of signal 200 of the previous time period in accordance with EQ. 2 and determines:

$$T_{diff}=(\text{Measured\_Duty\_Cycle}-50\%)/50\% * T_{max} \quad (\text{EQ. 7})$$

Figure 5:
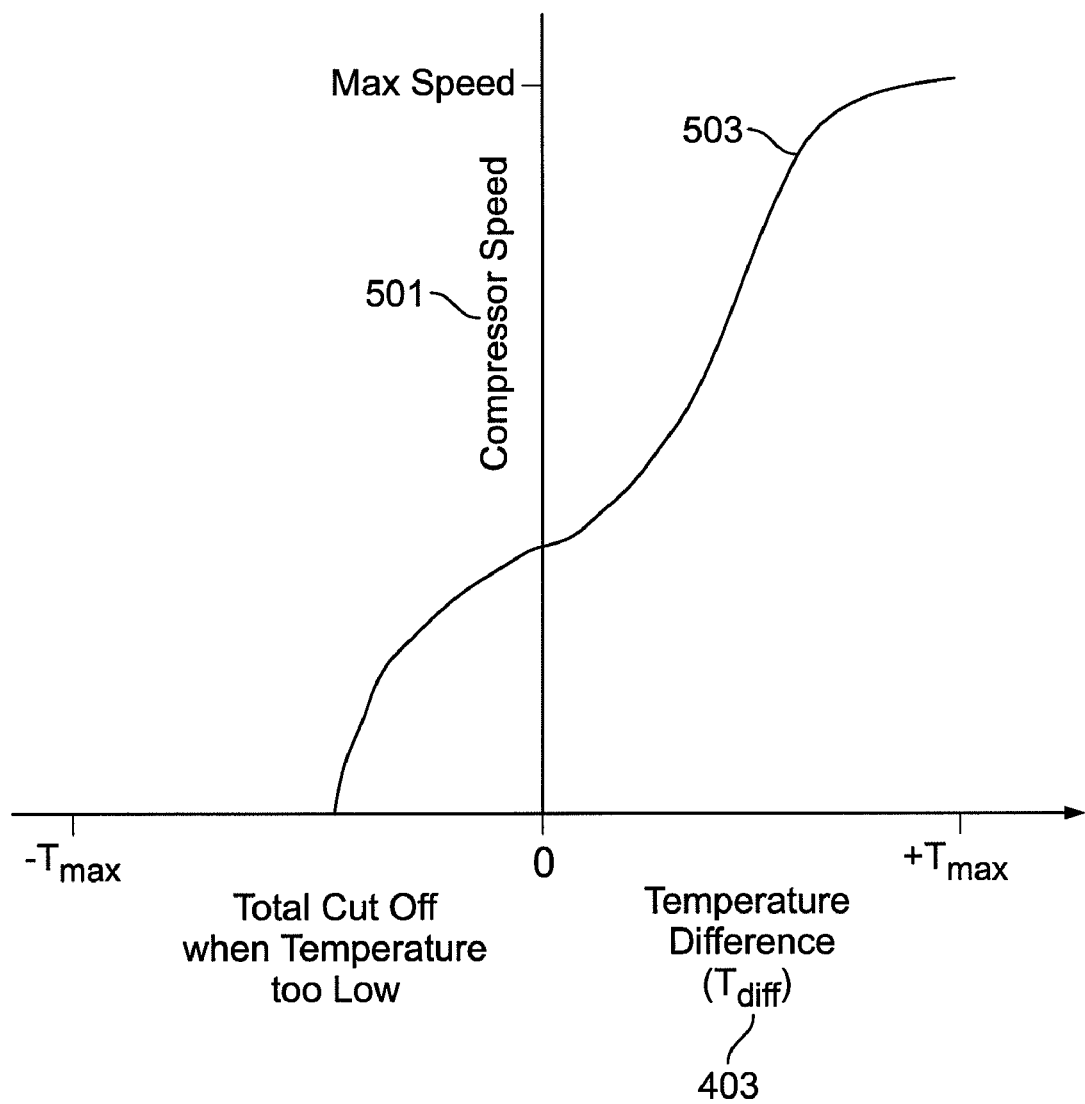
FIG. 5 shows a relationship of a determined compression speed and the temperature difference in accordance with an embodiment of the invention.

If $T_{diff}$ is positive, variable speed compressor 303 should turn faster based on a predetermined relationship, e.g., relationship 503 as shown in FIG. 5 as will be discussed. If $T_{diff}$ is negative, variable speed compressor 303 should turn slower based on an algorithm.

In an embodiment of the invention, compressor control unit 300 obtains $T_{max}$ by a user entering $T_{max}$ through keypad 309. While compressor controller unit 300 may obtain the value of $T_{max}$ from a configuration signal sent by thermostat unit 100, as previously discussed, the value of $T_{max}$ may be entered into keypad 111 by the user. Other embodiments of the invention may utilize a predetermined value of $T_{max}$ that is stored in memory.

Microprocessor control unit 301 may access lookup data structure 317 in order to determine the temperature difference ($T_{diff}$) and the compressor speed. (As will be discussed, the compressor speed is determined as a function of the temperature difference as shown in FIG. 5.) In order to obtain a desired efficiency, compressor 303 typically runs at a higher speed as the temperature difference becomes greater. When the compressor speed has been determined, microprocessor control unit 301 instructs PWM (pulse width modulated) controller 305 to drive IGBT (insulated-gate bipolar transistor) array 307 (via bus 311) so that compressor 303 runs at the desired compressor speed (over bus 313). PWM controller 305 is provided an indication of the actual compressor speed over feedback connection 315 in order to adjust the compressor speed to obtain the desired compressor speed. An exemplary embodiment will be further discussed with FIG. 9.

With the exemplary embodiment, compressor controller unit 300 functions with a traditional thermostat design but with software modifications as will be discussed.

FIG. 4 shows relationship 405 between temperature difference ($T_{diff}$) 403, referencing an ambient temperature (of an environmentally controlled space where thermistor 109 is located) to a set temperature, and measured duty cycle 401 of a signal in accordance with an embodiment of the invention. In the embodiment shown in FIG. 4, relationship 405 is in accordance with EQ. 7, although other embodiments may utilize a different relationship between the temperature difference and the duty cycle. In the example shown in FIG. 4, if measured duty cycle 401 equals 25%, temperature difference 403 is determined to equal $-0.5T_{max}$.

Figure 8:
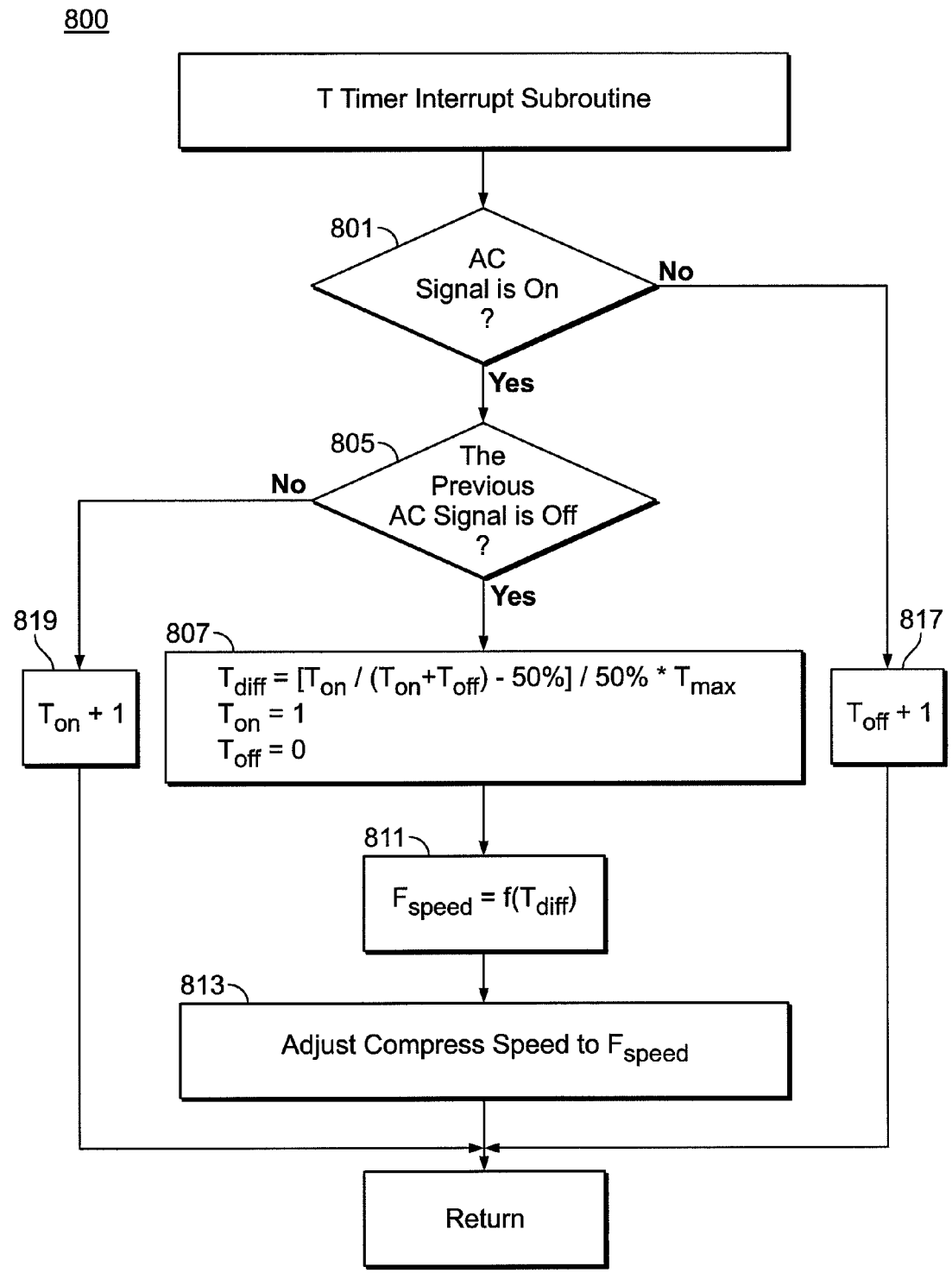
FIG. 8 shows a flow diagram that is executed by the compressor controller unit to process the signal, as shown in FIG. 2, during a time period.

As previously discussed, a duty cycle between minimum value 407 and maximum value 409 is utilized in order to facilitate the detection of signal edges by microprocessor control unit 301. In an embodiment of the invention, microprocessor control unit 301 analyzes signal 200 in a time-interrupt basis as shown in FIG. 8. Depending on the value of the time interval between interrupts, microprocessor control unit 301 may not detect a transition of signal 200. (Between time-interrupts, microprocessor control unit 301 may be executing other tasks, e.g., diagnostics and executing commands entered through keypad 309.) Consequently, the temperature difference is limited between $T_{max}-\Delta_{temp}$ and $-T_{max}+\Delta_{temp}$ so that signal transitions can be detected. As the time durations between time-interrupts become smaller, the value of $|\Delta_{temp}|$ becomes smaller. If microprocessor control unit 301 processes time-interrupts quickly enough, $\Delta_{temp}$ is essentially zero.

FIG. 5 shows relationship 503 of a determined compression speed 501 and the temperature difference 403 in accordance with an embodiment of the invention. Microprocessor control unit 301 measures duty cycle 401 and determines temperature difference 403 using relationship 405. In an embodiment of the invention, microprocessor control unit 301 accesses lookup data structure 317 using an address determined by duty cycle 401 to obtain temperature difference 403. Microprocessor control unit 301 subsequently accesses lookup data structure 317 to determine compression speed 501 using an address determined by temperature difference 403 to obtain compression speed 501. Because the temperature difference typically varies from time period to time period, as suggested by FIG. 2, compressor speed 501 consequently varies.

Figure 6:
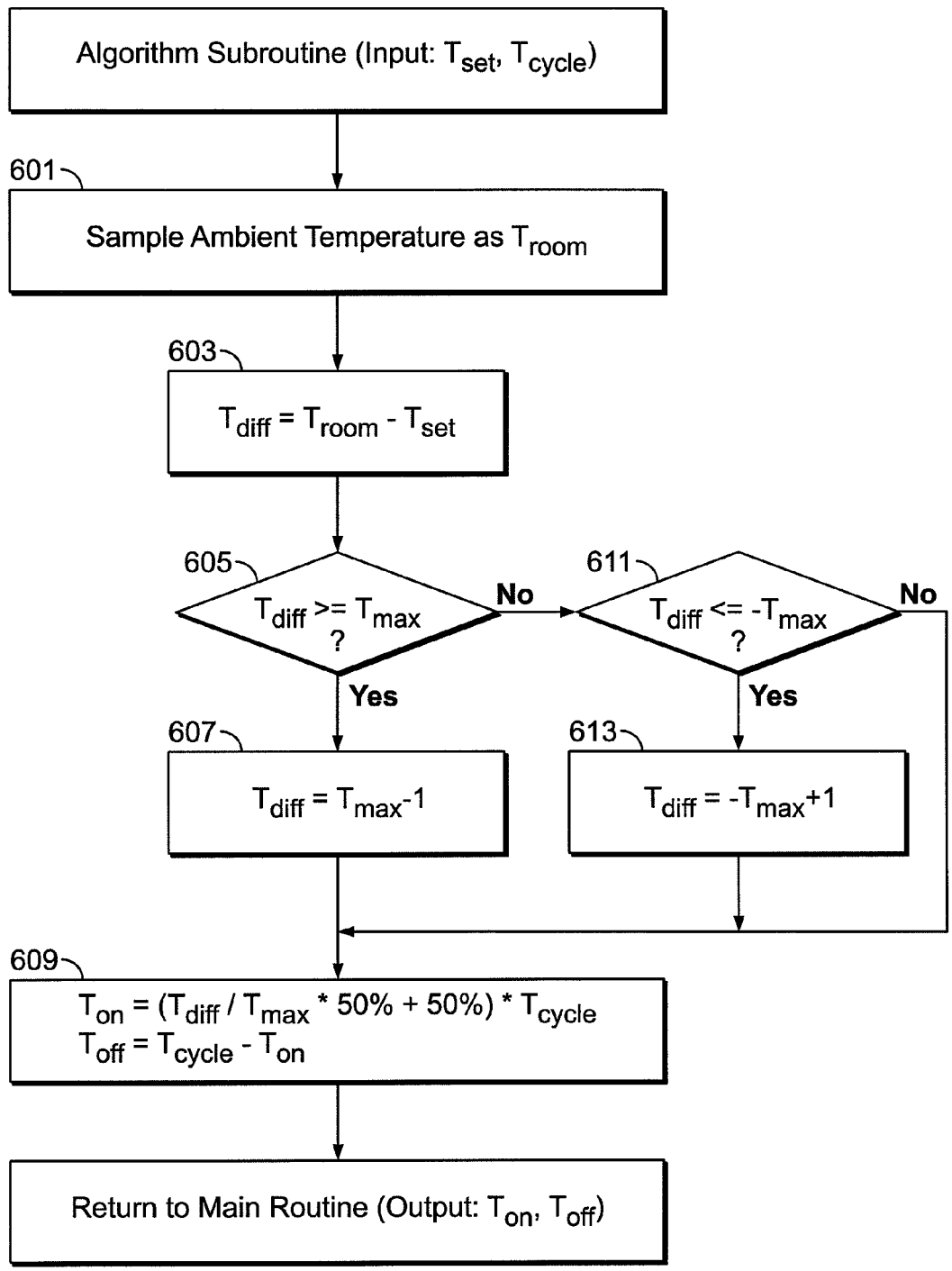
FIG. 6 shows a flow diagram that is executed by the thermostat unit in accordance with an embodiment of the invention.

FIG. 6 shows flow diagram 600 that is executed by microprocessor control unit 107 in accordance with an embodiment of the invention. Microprocessor control unit 107 obtains the set temperature $T_{set}$, the time period ($T_{cycle}$), and the ambient temperature ($T_{room}$) from thermistor 109 in step 601. In step 603, microprocessor control unit 107 determines the temperature difference ($T_{diff}$) in accordance with EQ. 1. If the temperature difference is larger than the maximum temperature difference ($T_{max}$), as determined by step 605, the temperature difference is limited to $T_{max}-1$ as determined by step 607. Otherwise, step 611 determines whether the temperature difference is less than the negative maximum temperature difference ($-T_{max}$) in step 611. If so, the temperature difference is limited to $-T_{max}+1$ in step 613. Otherwise, the activated time duration ($T_{on}$) is determined in accordance with EQ. 5 in step 609. Signal 200 is generated in accordance with $T_{on}$ and $T_{off}$ as determined by flow diagram 600.

Figure 7:
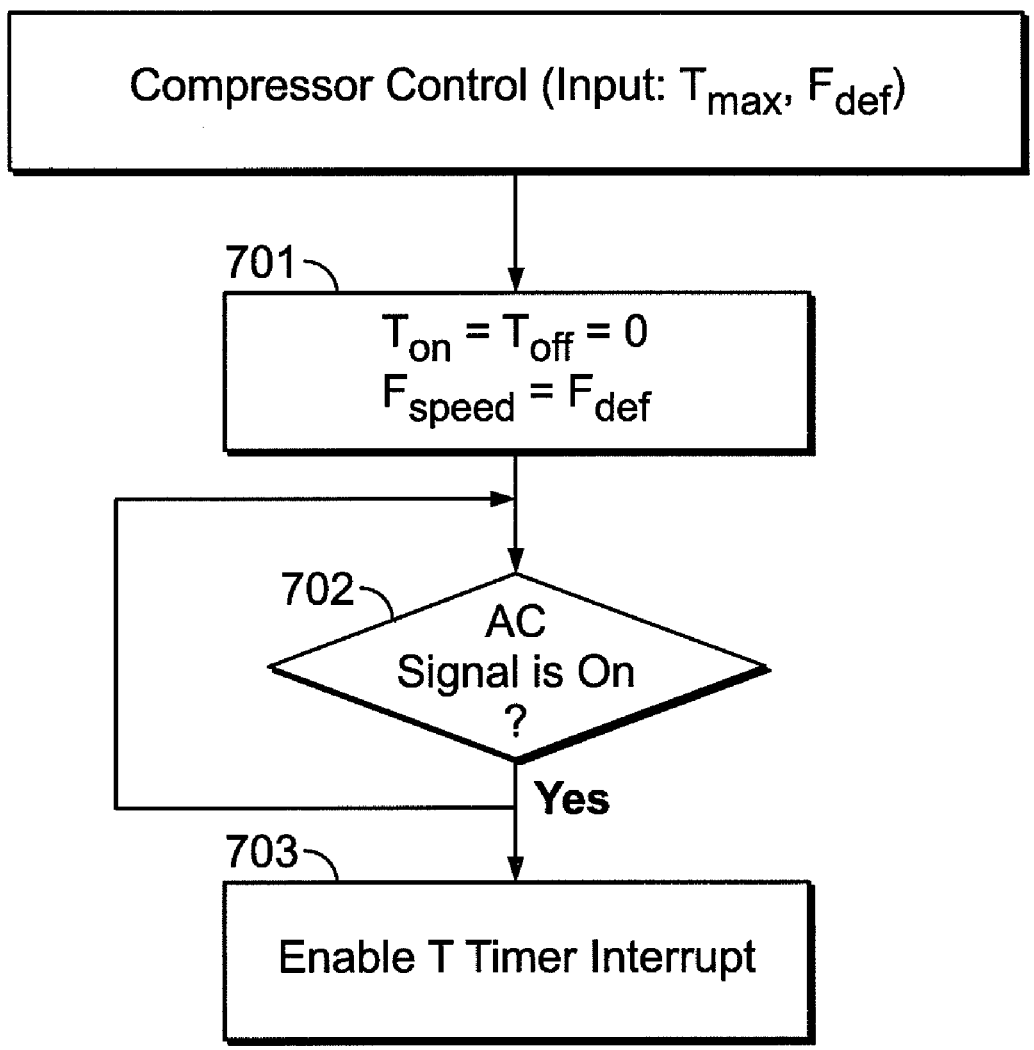
FIG. 7 shows a flow diagram that is executed by the compressor controller unit to initiate processing of the signal, as shown in FIG. 2.

FIG. 7 shows flow diagram 700 that is executed by compressor controller unit 300 to initiate processing of signal 200, as shown in FIG. 2, during a time period. Microprocessor control unit 301 obtains $T_{max}$ and $F_{def}$ to initiate processing over the current time period. Consequently, microprocessor control unit 301 resets $T_{on}$, $T_{off}$, and sets the compressor speed variable $F_{speed}$ to $F_{def}$ in step 701. In step 702, microprocessor control unit 301 determines whether signal 200 is present (i.e., whether any signal transitions have been detected.) In step 703, interrupts are configured to occur periodically (every $T_{interrupt}$ time interval) so that pulse edges can be detected. For example, if the minimum pulse duration is 1 second (corresponding to an emergency stop), interrupts are configured to occur at least every 0.5 seconds. As will be discussed, procedure 800 (as shown in FIG. 8) is processed every $T_{interrupt}$ time interval.

FIG. 8 shows flow diagram 800 that is executed by compressor controller unit 300 to process signal 200, as shown in FIG. 2, during a time period. In the following discussion, one should note that flow diagram 800 determines whether there are signal edges detected in signal 200. If not, compressor 303 is not active.

In step 801, microprocessor control unit 301 determines if signal 200 is conducting AC power (typically 24 volts AC) during $T_{on}$. If not, the $T_{off}$ counter is incremented in step 817. (In flow diagram 800, $T_{off}$ counter and $T_{on}$ counter are appropriately incremented so that the duty cycle can be determined when flow diagram is respectively executed during the current timer period. Once the current time period is completed, the duty cycle is determined by step 807 as will be discussed.) The process will exit (i.e., flow diagram 800 determines that the air conditioner is not active).

If microprocessor control unit 301 determines that signal 200 is conducting AC power during $T_{on}$ in step 801, microprocessor control unit 301 determines if signal 200 was previously in a non-conductive state (i.e., deactivated time duration 201*b* for time period 201) in step 805. If not, the $T_{on}$ counter is incremented in step 819, and process 800 is exited. If so, a rising signal edge is detected and step 807 is executed.

In step 807 (corresponding to a rising edge just being detected), the temperature difference is determined in accordance with EQ. 7 for the time period that has just completed. The $T_{on}$ counter and the $T_{off}$ counter are then reset. In step 811, microprocessor control unit 301 determines the speed of compressor 303 in accordance with a predetermined function $f(T_{diff})$, e.g., relationship 503 as shown in FIG. 5. In step 813, the compressor speed $F_{speed}$ is adjusted, in which microprocessor control unit 301 provides the updated compressor speed to PWM controller 305. Compressor 303 is consequently instructed to change its speed through bus 311, IGBT array 307, and bus 313.

Figure 9:
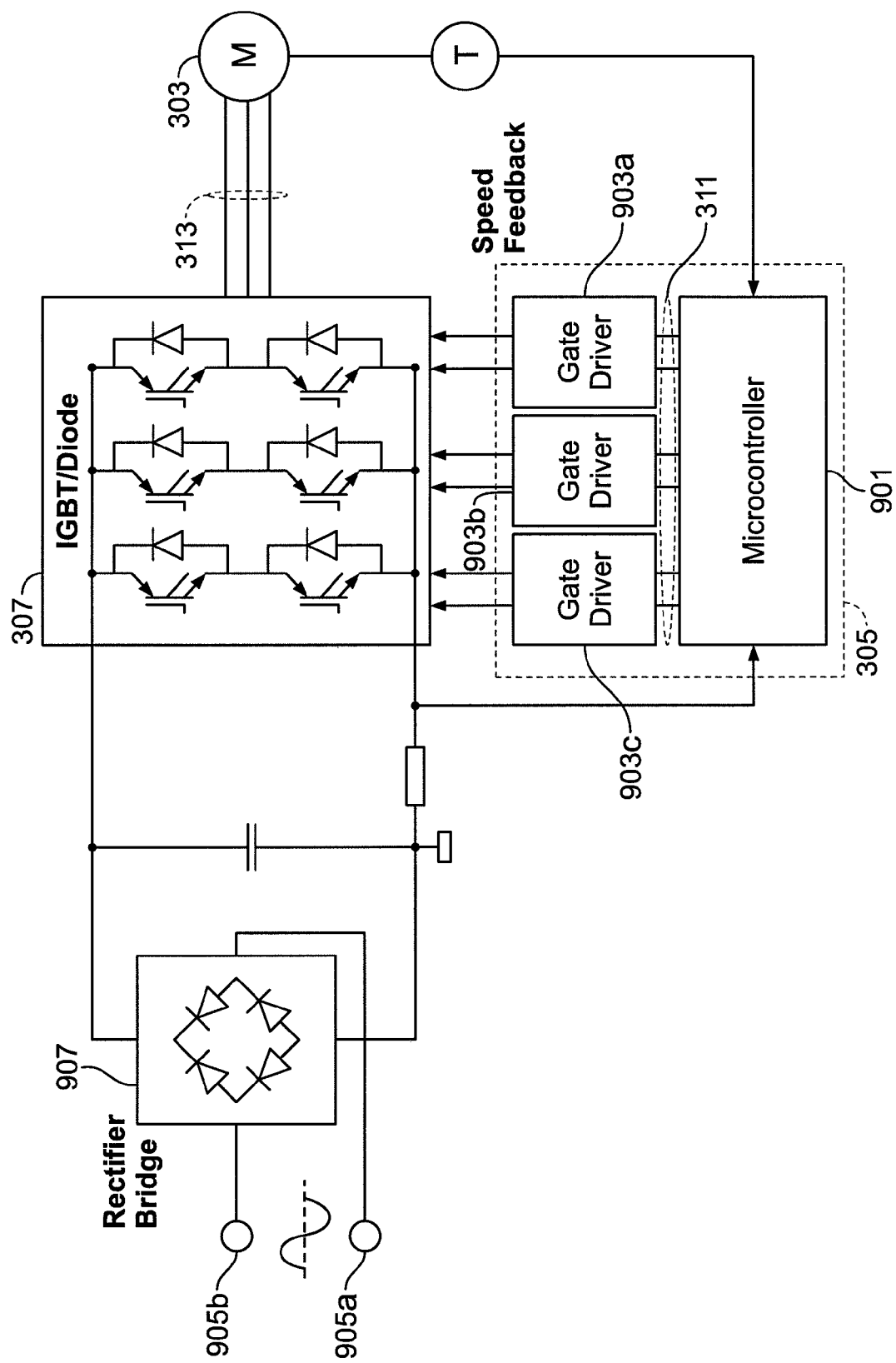
FIG. 9 shows an exemplary configuration for controlling a variable speed compressor.

FIG. 9 shows an exemplary configuration for controlling variable speed compressor 303. In the exemplary embodiment, compressor 303 comprises a three-phase motor; however, other embodiments may support other types of motors, e.g., single-phase induction motors, DC motors, and universal motors.

Compressor 303 is powered by AC power lines 905*a*, 905*b* through rectifier bridge 907 and IGBT array 307. PWM controller 305 configures IGBT array 307 to control compressor 303 at the desired compressor speed. PWM controller 305 includes microcontroller 901 and gate drivers 903*a*-903*c*. The speed of compressor 303 is controlled by PWM controller 305, in which the voltage-to-frequency ratio is adjusted with a speed feedback configuration.

Embodiments of the invention support a heating function in a HVAC system. When supporting the heating function a controller unit, in conjunction with a thermostat unit, couples with a variable blower motor of a furnace. The speed of the variable blower motor is varied in accordance with characteristics of the motor and thermodynamics considerations.

Figure 10:
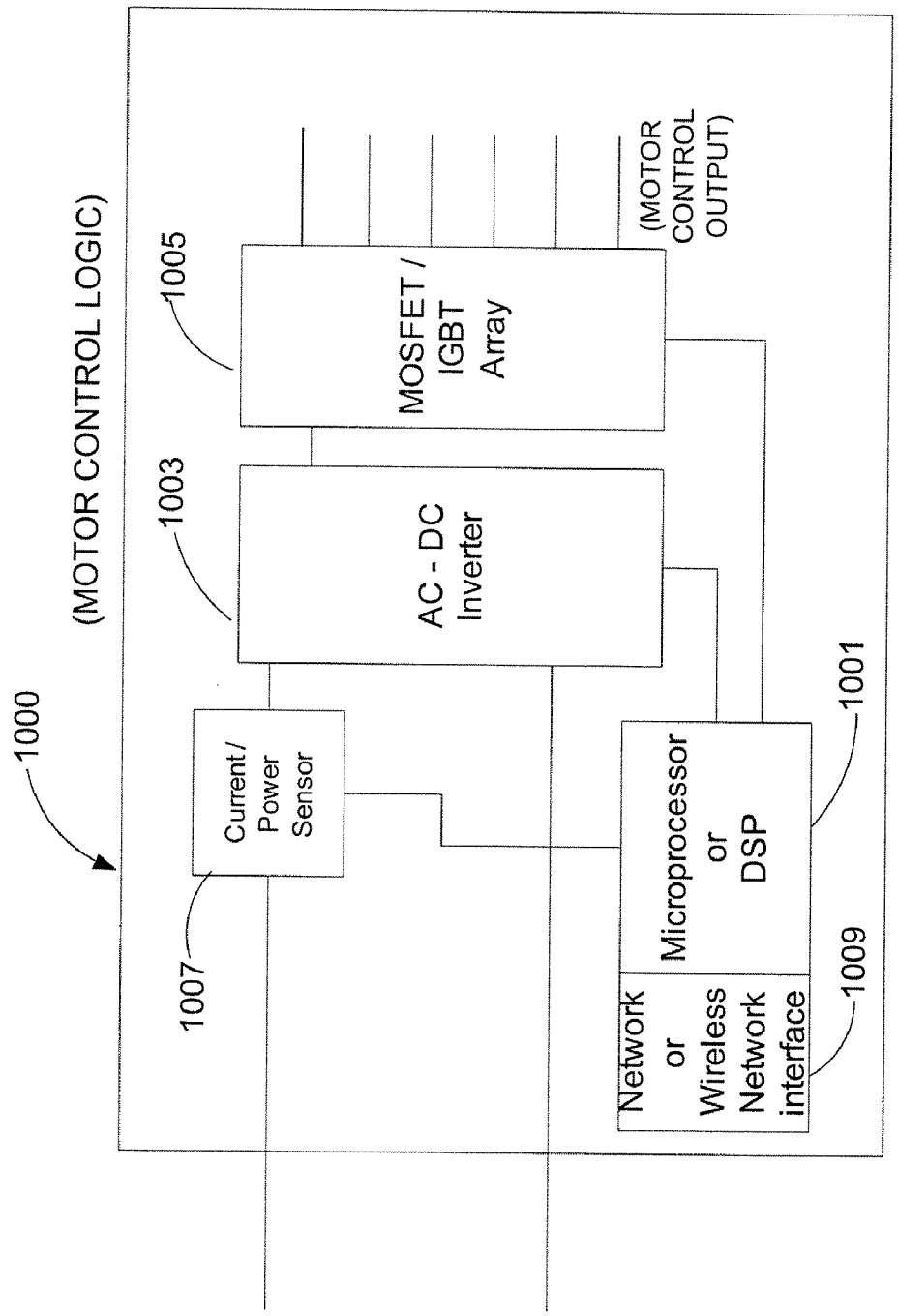
FIG. 10 shows a control logic unit with current/power sensing in accordance with an embodiment of the invention.

FIG. 10 shows a control logic unit 1000 with current/power sensing in accordance with an embodiment of the invention. Control logic unit 1000 controls a speed of a motor or compressor (as previously discussed) through AC-DC inverter 1003 and array 1005. (In the embodiment shown in FIG. 10, processor 1001 controls both the speed of a variable speed device as well as determine the energy consumption of the variable speed device.) Control logic unit 1000 includes power measurement circuit 1007 that is integrated with motor control logic. For example, circuit 1007 may include a high power, low value resistor. Processor 1001 obtains a power measurement from power measurement circuit 1007 for an incremental time duration (e.g., 1 msec). Because the incremental time duration $\Delta T$ is sufficiently small, the power utilization $P_i$ is approximately constant, and thus the incremental energy consumption $\Delta E_i$ during the $i^{th}$ time interval for a controlled device (not shown in FIG. 10) is determined by:

$$\Delta E_i = P_i \Delta T \qquad \text{EQ. 8}$$

Power measurement circuit 1007 may indirectly measure the power utilization of a controlled device by measuring the electrical current (I). For example, if the real component (R) of the controlled device's impedance is known, processor 1001 may determine power utilization by multiplying the $I^2$ by R.

Processor 1001 accumulates the total energy consumption by adding the incremental values of energy consumption using:

$$E_T = \sum_i \Delta E_i \qquad \text{EQ. 9}$$

Processor 1001 may further partition the total energy consumption so that energy components $E_j$ of the total energy consumption are maintained corresponding to different time intervals (e.g., peak hours) and different days (e.g., weekends versus weekdays). For example, $$E_T = \sum_j E_j \qquad \text{EQ. 10}$$

By multiplying the measured power by the incremental time duration and summing the products, the total energy consumption of the controlled device (e.g., motor or compressor) over a recorded time period is determined.

Figure 13:
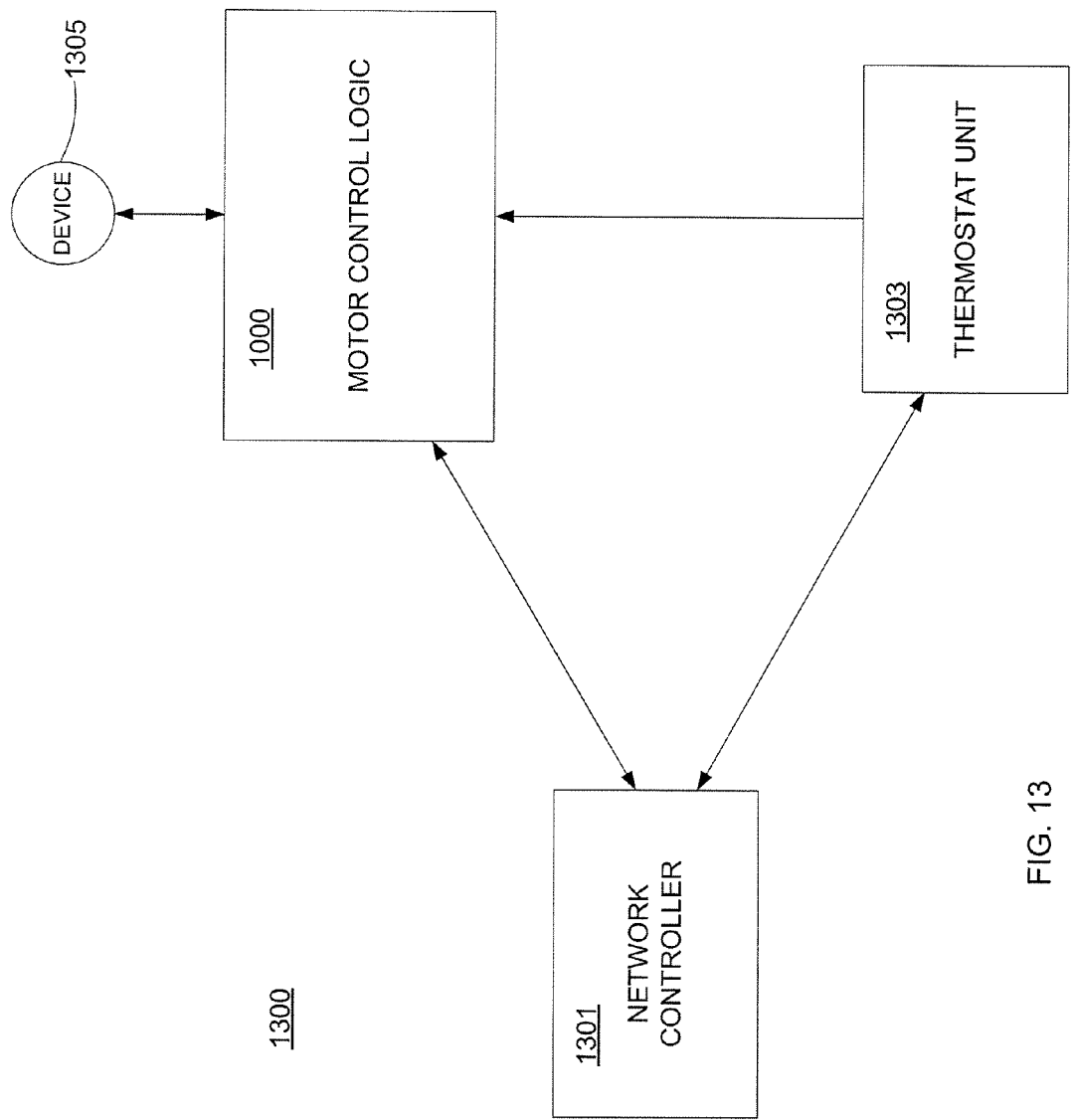
FIG. 13 shows an architecture of a system for measuring and conveying information about energy consumption in accordance with an embodiment of the invention.

Processor 1001 continues to add the incremental energy consumption $\Delta E_i$ to the previous value of the total energy consumption to update the total energy consumption. The total energy consumption is accumulated until a valid and successful transmission of the requested information to network controller 1301 (as shown in FIG. 13) through network interface 1009 occurs.

Network interface 1009 may interface to various types of networks including landline, cable, satellite, and terrestrial wireless networks.

The network controller may request that the total energy consumption be reported by control logic unit 1000. Also, with embodiments of the invention, specific energy components may be requested from control logic unit 1000 by the network controller. For example, the network controller may request the energy consumption of the controlled device during peak hours on a Friday.

With embodiments of the invention, accumulation of the energy consumption continues until processor 1001 receives an acknowledgment (feedback) from the network controller that the transmission with the requested information was successful. Processor 1001 subsequently deducts the value of the energy consumption that was transmitted. Once control logic unit 1000 receives a confirmation, processor 1001 deducts the value of the energy consumption (e.g., a specified energy component) that was transmitted to the network controller.

With embodiments of the invention, the network controller (e.g., network controller 1301) provides an acknowledgment with the received value of the energy consumption to control logic unit 1000. If the received value in the acknowledgment is consistent with the value sent to the network controller, processor 1001 deducts the received value from the total energy consumption of the controlled device. The acknowledgment may comprise a fixed code or codes with the returned value as a verification mechanism of the transmitted value.

Figure 11:
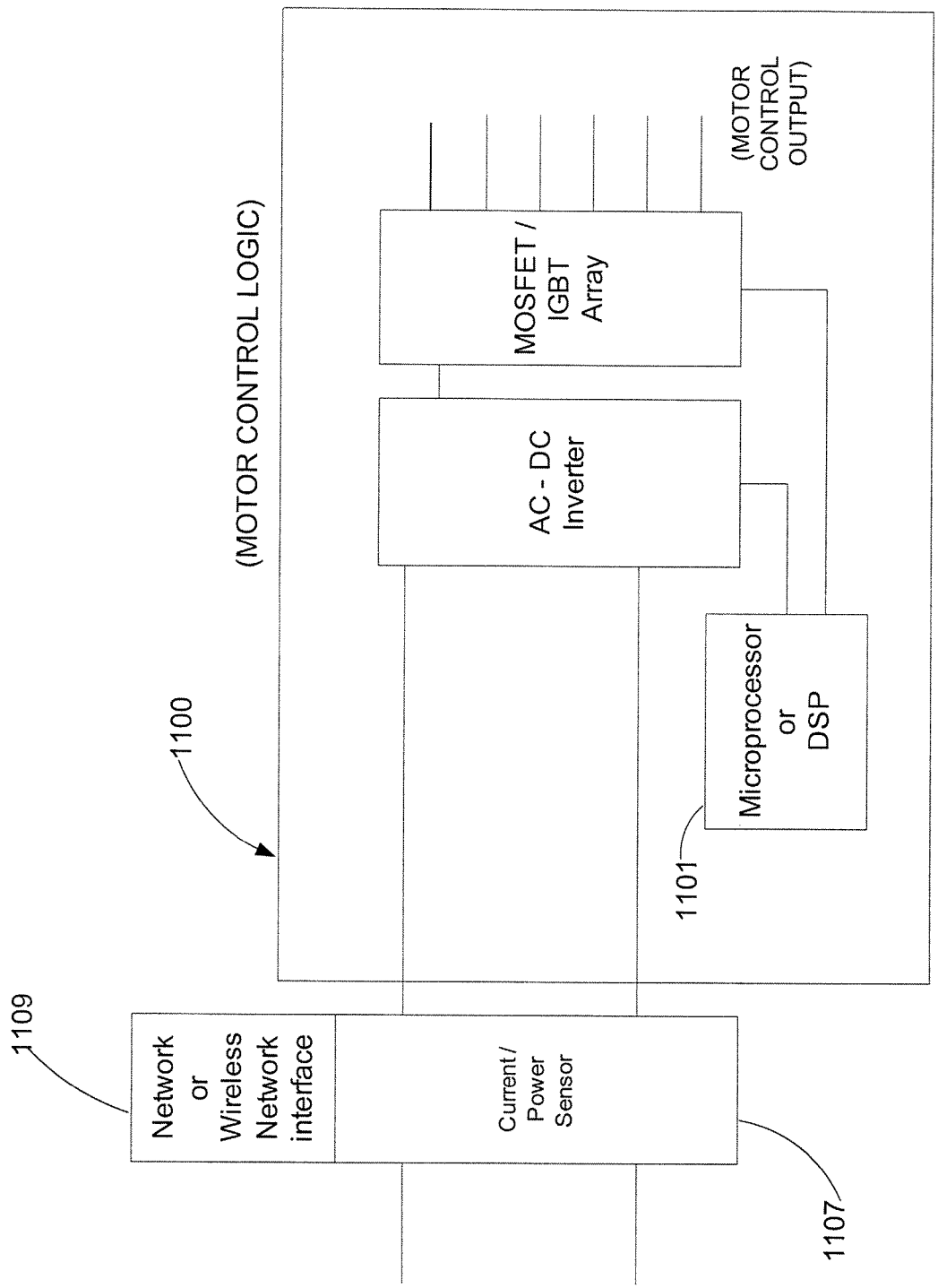
FIG. 11 shows a control logic unit with an associated measurement unit for measuring energy consumption by a motor/compressor in accordance with an embodiment of the invention.

FIG. 11 shows control logic unit 1100 with associated measurement unit 1107 for measuring energy consumption by a motor/compressor in accordance with an embodiment of the invention. As illustrated in FIG. 11, control logic unit 1100 is physically separate from an associated unit comprising measurement unit 1107 and network interface 1109. Processor 1101 controls the speed of a controlled device (not shown in FIG. 11) in accordance with the previous discussion. Measurement unit 1107 accumulates the total energy consumption until requested by a network controller through network interface 1109. When a request is received, measurement unit 1107 adjusts the total energy consumption in accordance with the previous discussion.

Figure 12:
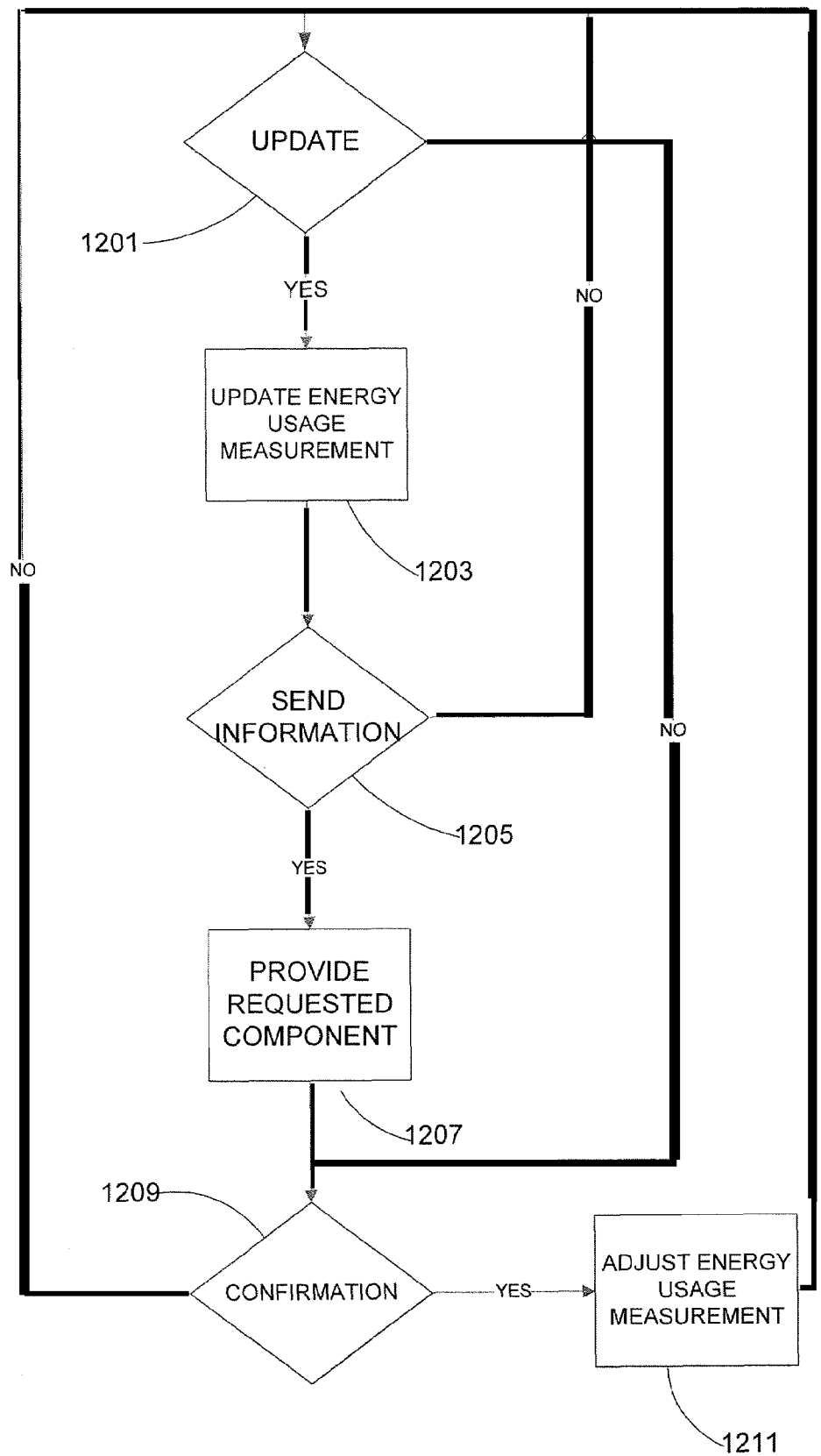
FIG. 12 shows a flow diagram for a logic controller when measuring and conveying information about energy consumption by an electrical device in accordance with an embodiment of the invention.

FIG. 12 shows flow diagram 1200 for logic controller 1000 when measuring and conveying information about energy consumption by an electrical device in accordance with an embodiment of the invention. In step 1201, processor 1001 determines whether to update the total energy consumption. If so, processor 1001 obtains the incremental power utilization from power measurement circuit 1007, determines the incremental energy consumption, and adds the incremental energy consumption to the previous value of the total energy consumption in step 1203.

If the network controller has requested energy consumption information, as determined by step 1205, processor 1001 transmits the requested information to network controller in step 1207. If a confirmation is received from the network controller, as determined by step 1209, processor 1001 adjusts the value of the total energy consumption by the transmitted value in step 1211.

FIG. 13 shows an architecture of system 1300 for measuring and conveying information about energy consumption in accordance with an embodiment of the invention. System 1300 includes control logic unit 1000 (which controls the speed of a controlled device), network controller 1301, and thermostat unit 1303 (which instructs control logic unit 1000 in accordance with previous discussions).

Control logic unit 1000 measures the total energy consumption of controlled device 1305 and reports requested information about consumed energy when requested by network controller 1301. For example, network controller 1301 may obtain the energy consumption of device 1305 during a peak hour.

Network controller 1301 may further determine that the temperature set needs to be adjusted in order to reduce the projected energy consumption of electrical device 1305 in order to reduce energy costs. If so, network controller 1301 sends a new set temperature value to thermostat unit 1303. Consequently, thermostat unit 1303 instructs control logic unit 1000 to controlled device 1305 in accordance with the new set temperature using EQs. 1-7 as previously discussed.

Figure 14:
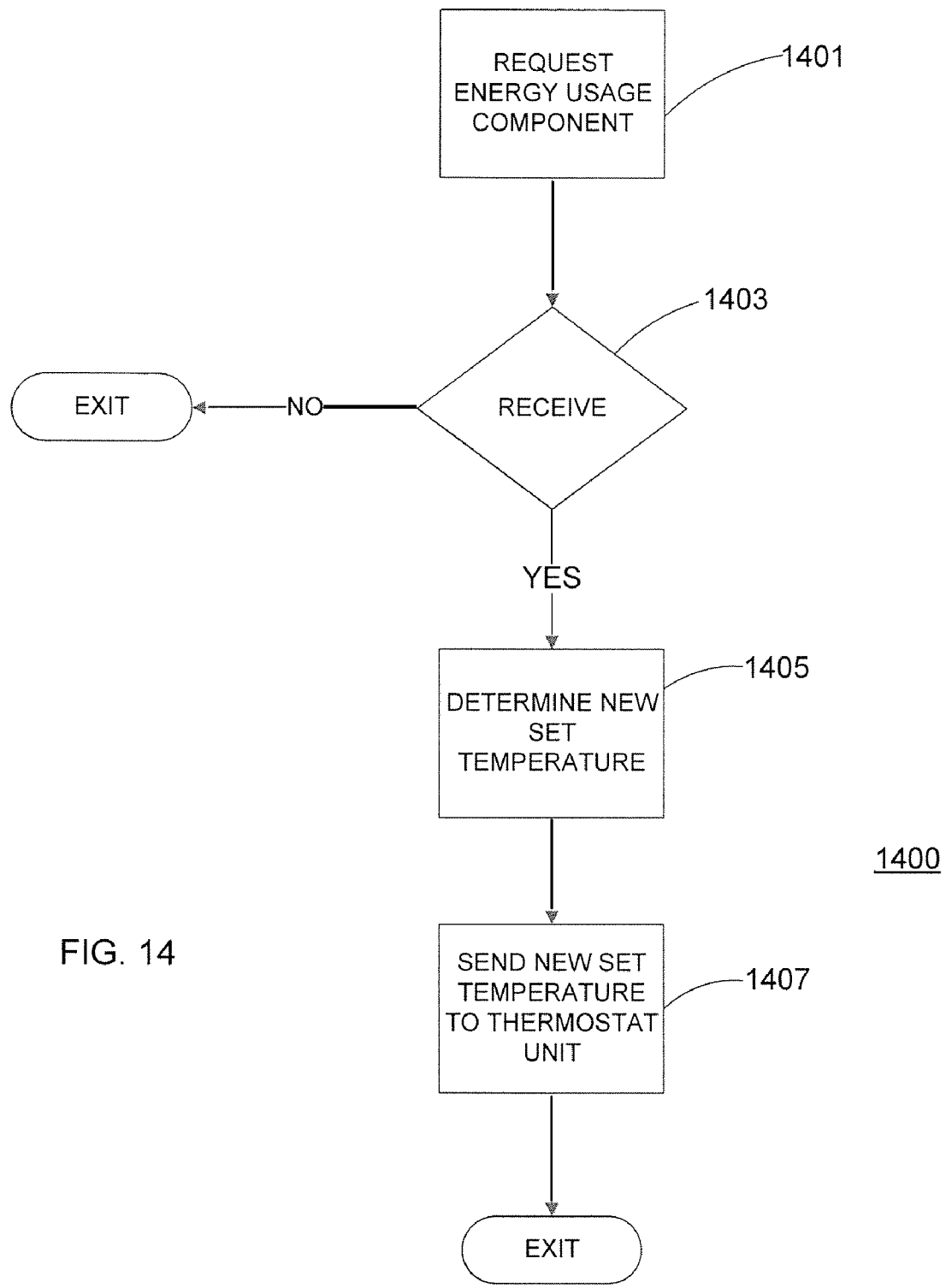
FIG. 14 shows a flow diagram for a network controller when obtaining information about energy consumption from a control logic unit in accordance with an embodiment of the invention.

FIG. 14 shows flow diagram 1400 for network controller 1301 when obtaining information about energy consumption from control logic unit 1000 in accordance with an embodiment of the invention. In step 1401 network controller 1301 requests a requested energy component from control logic unit 1000 and receives the requested information in step 1403. Network controller 1301 may specify a time and date (e.g., peak hour during the week) in the request.

In step 1405, network controller 1301 may further determine a new set temperature based on the value of the energy consumption that is received from control logic unit 1000. For example, network controller 1301 may determine that controlled device 1305 is using an amount of energy that exceeds an target limit. Consequently, network controller 1301 may provide a new set temperature to thermostat 1302 in step 1407.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   an energy sensor configured to measure an incremental energy value consumed by a variable speed device during an incremental time duration;
   a network interface configured to interface to a communications network; and
   a processor configured to:
      obtain the incremental energy value;
      accumulate an energy usage measurement in accordance with the incremental energy value;
      provide requested information about energy consumption of the variable speed device in response to a request from a network controller through the network interface; and
      adjust the energy usage measurement in accordance with the requested information;
   an array configured to provide at least one control signal to the variable speed device to control a speed of the variable speed device; and
   a pulse width modulation controller configured to control a pulse width of the at least one control signal in accordance with a temperature difference and a feedback signal from the variable speed device, the feedback signal being indicative of a difference between a predetermined target device speed and an actual device speed.

2. The apparatus of claim 1, the processor further configured to:
   partition the energy usage measurement into at least one energy component, the at least one energy component corresponding to the energy consumption of the variable speed device during an associated time interval.

3. The apparatus of claim 2, the processor further configured to:
   subtract a requested energy component from the usage measurement.

4. The apparatus of claim 1, the processor further configured to:
   adjust the energy usage measurement only when a confirmation is received from the network controller.

5. The apparatus of claim 4, the processor further configured to:
   deduct an energy value transmitted to the network controller from the energy usage measurement.

6. The apparatus of claim 4, the processor further configured to:
   receive a received energy value from the network controller; and
   deduct the received energy value from the energy usage measurement.

7. The apparatus of claim 1, wherein the energy sensor is integrated with a device logic controller that controls a speed of the variable speed device.

8. The apparatus of claim 1, wherein the energy sensor is separately situated from a device logic controller that controls a speed of the variable speed device.

9. The apparatus of claim 1, the energy sensor comprising an electrical current measurement device.

10. The apparatus of claim 1, the energy sensor comprising an electrical power measurement device.

* * * * *